Figure 1:
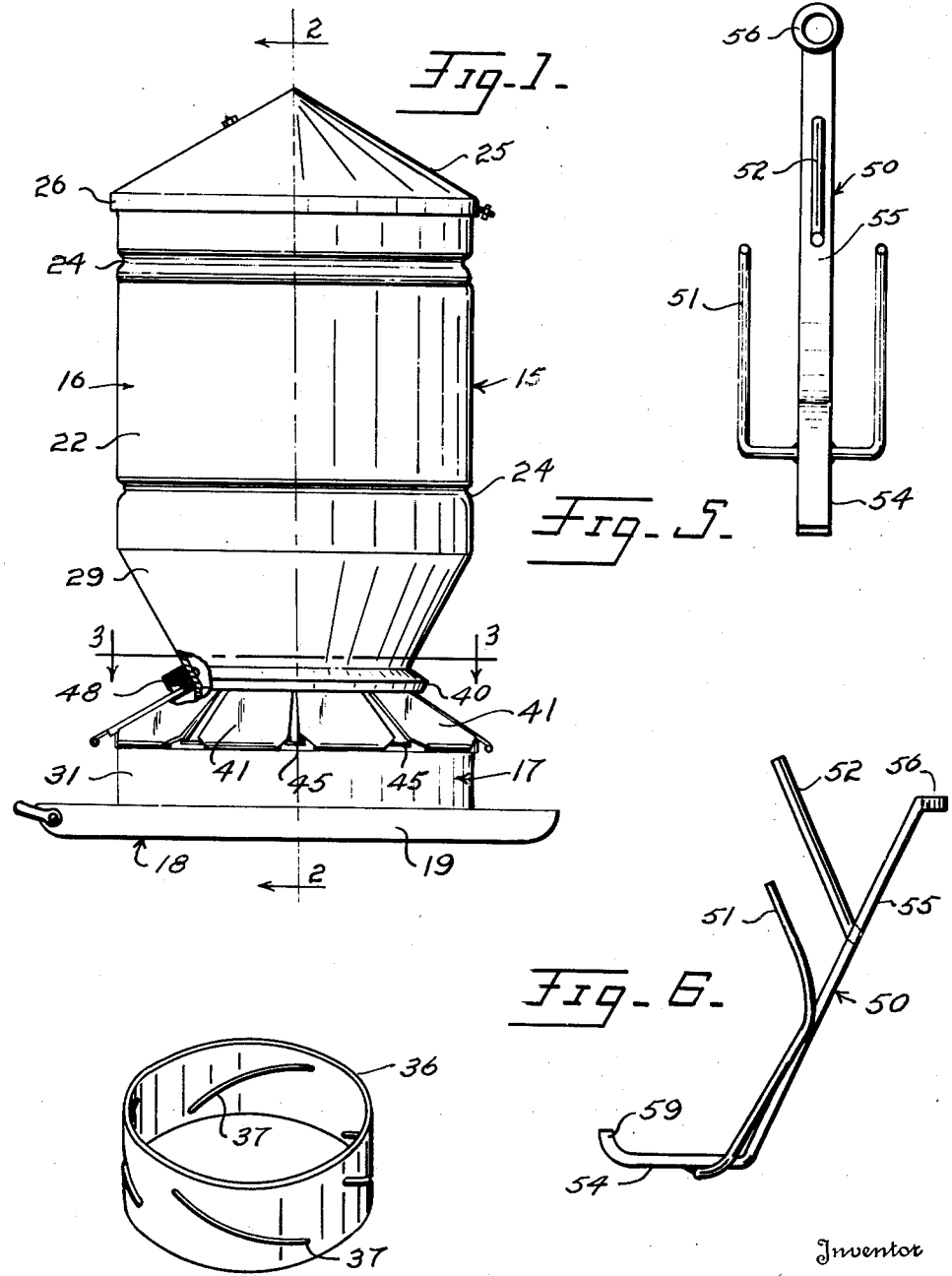

June 27, 1950          W. J. PAX          2,513,200

HOG FEEDER

Filed Oct. 18, 1946          3 Sheets-Sheet 1

Inventor
WILLIAM J. PAX

June 27, 1950 W. J. PAX 2,513,200
HOG FEEDER

Filed Oct. 18, 1946 3 Sheets-Sheet 2

INVENTOR.
WILLIAM J. PAX
BY
Kimmel & Crowell
— ATTORNEYS —

June 27, 1950     W. J. PAX     2,513,200
HOG FEEDER

Filed Oct. 18, 1946     3 Sheets-Sheet 3

INVENTOR.
WILLIAM J. PAX
BY
Kimmel & Crowell
— ATTORNEYS —

Patented June 27, 1950

2,513,200

UNITED STATES PATENT OFFICE 2,513,200

HOG FEEDER

William J. Pax, Celina, Ohio

Application October 18, 1946, Serial No. 704,171

2 Claims. (Cl. 119—53.5)

This invention relates to hog feeders and more particularly to one in which the feed is agitated by an animal feeding therefrom.

It is an object of this invention to provide a hog feeder having a feed pan and a hopper supported above the feed pan so that the feed in the hopper will fall into the feed pan where it may be taken by an animal, the feeder being so constructed and arranged that the feed will be agitated in the hopper by the animal as it feeds from the pan.

Another object of this invention is to provide a hog feeder having a hopper and a feed pan wherein the feed is adapted to flow from the hopper to the feed pan under an adjustable valve or plate in the feed pan whereby the flow of feed may be varied according to the desire of the owner or operator thereof.

Still another object of this invention is to provide a hog feeder of the kind to be hereinafter described, having a hopper with a frusto-conical lower end supported in a feed pan and a cover over the top of the hopper secured thereto in such a manner that the cover may be raised and slid from the hopper and supported on the side of the hopper by a rod carried by the cover engaging through an opening in the wall of the hopper at its upper end.

A further object of this invention is to provide a hopper of this kind having a flanged rain cover, the outer edge of which is formed with polygonal straight edges, covering the hinges of the trapezium shaped closures, a tapered section between each closure, with flanges bent upward for making it rainproof.

With the above and other objects in view, my invention consists in the arrangement, combination and details of construction disclosed in the drawings and specification, and then more particularly pointed out in the appended claims.

Figure 2:
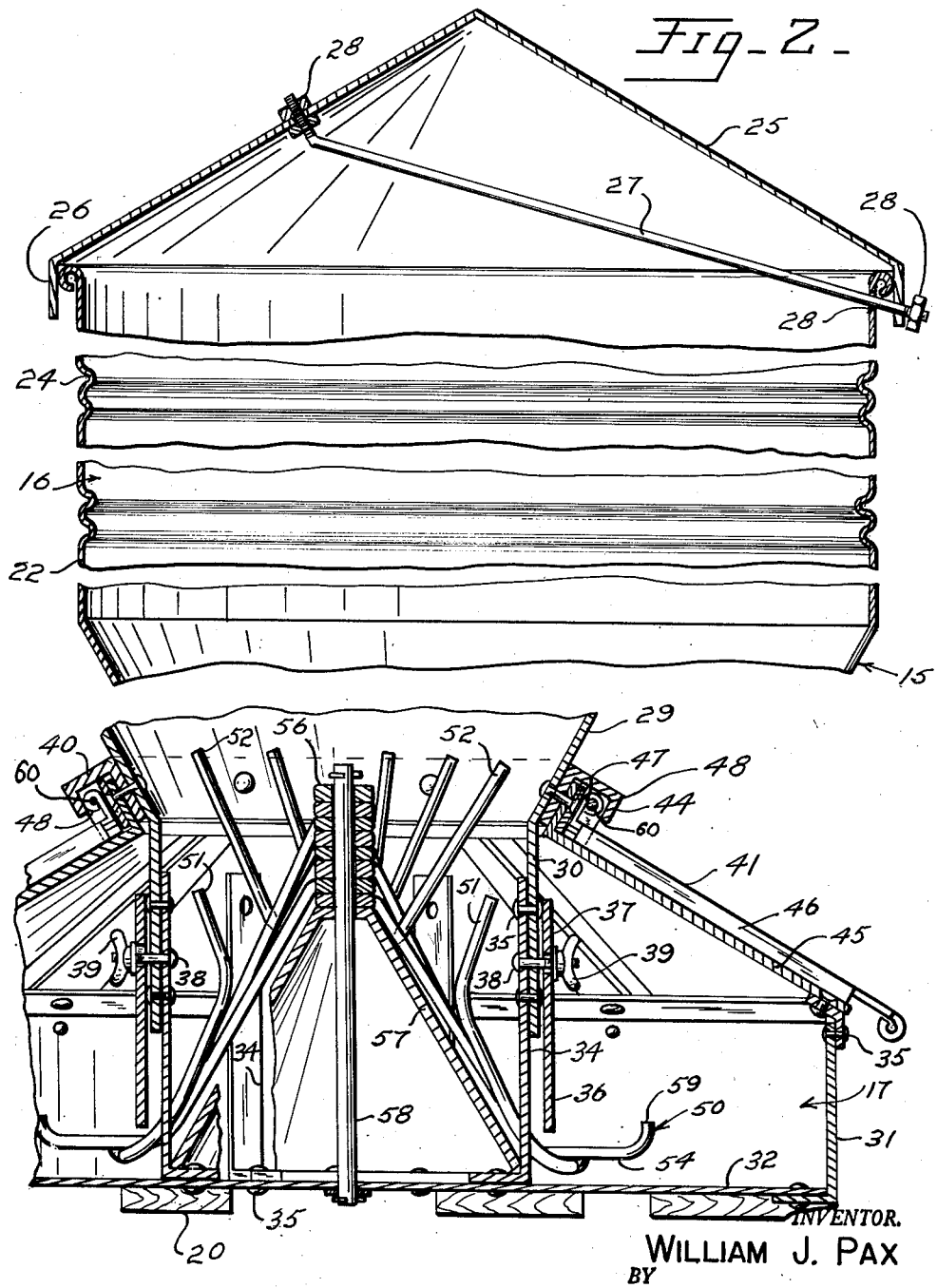
Figures 3, 7:
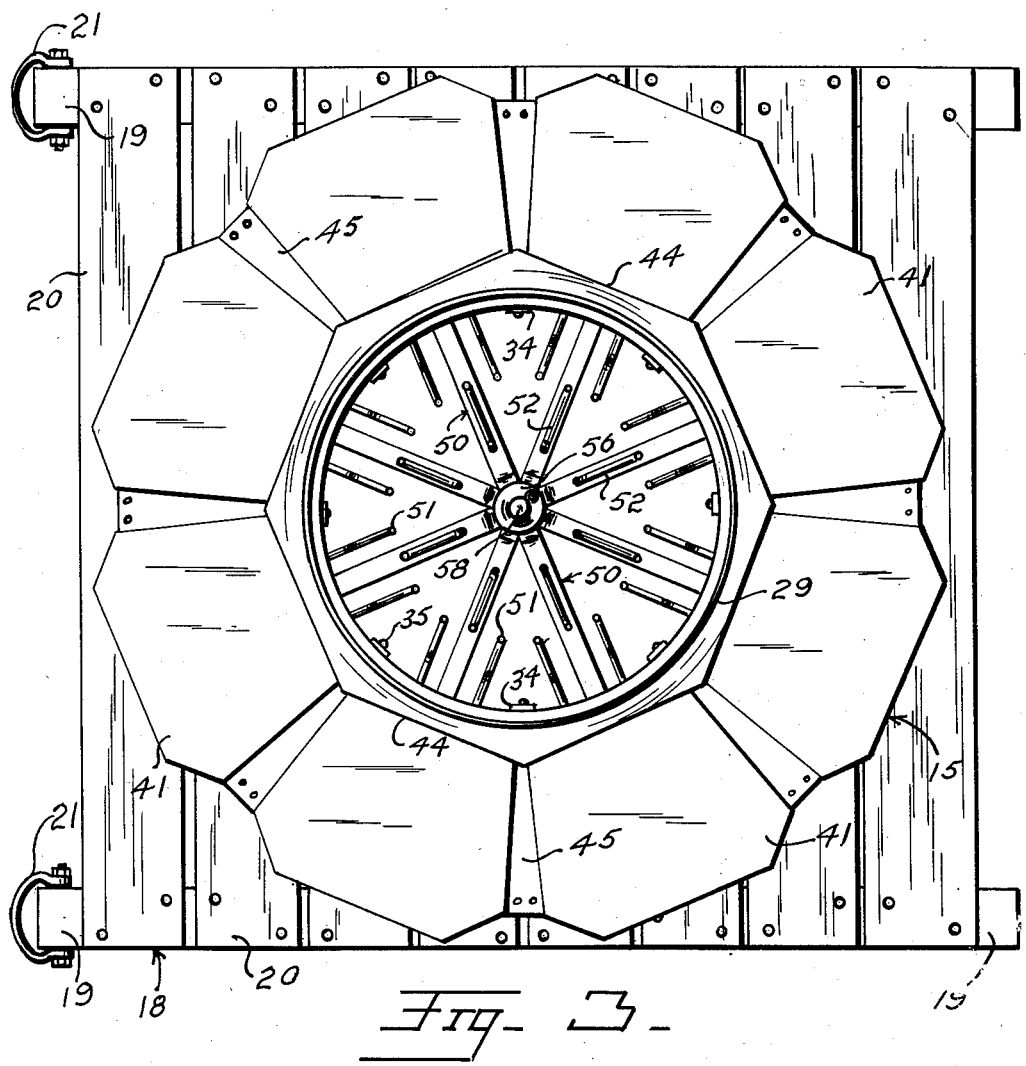

In the drawings,

Figure 1 is a side elevation of my hog feeder,

Figure 2 is an enlarged vertical section, partly broken away, taken on the line 2—2 of Figure 1, Figure 3 is an enlarged horizontal section taken on the line 3—3 of Figure 1, Figure 4 is an enlarged perspective view of the valve, removed from the feeder, Figure 5 is a top plan view of an agitator, removed from the feeder, Figure 6 is a side elevation of the agitator, Figure 7 is a perspective view of the rain cover, removed from the feeder.

Referring to the drawings, the numeral 15 designates generally a hog feeder constructed according to an embodiment of my invention. The feeder 15 is formed with a hopper 16 for retaining a supply of feed and a feeder pan 17 from which the animals may take the feed. The entire feeder 15 is adapted to be supported on a base or skid 18 having a pair of oppositely disposed side members 19 which are rounded at their ends so the skid 18 may readily slide along the ground, and transverse members 20 fixed to the sides 19 on which the pan 17 is adapted to rest. Lugs 21 or handles are fixed to the ends of the side members 19 for pulling the skid 18 and feeder 15 from place to place.

The hopper 16 is formed with an upstanding substantially cylindrical body portion 22, being corrugated as at 24 for stiffening the side walls thereof. The feeder 15 is preferably made of galvanized steel sheet metal but may be made of other suitable material for holding the feed and resisting the weather. The upper end of the body 22 is open and this opening is adapted to be closed by a substantially conical cover 25, having a downwardly extending flange 26 extending from the periphery of the lower divergent end thereof. The cover 25 is retained on the feeder 15 by a rod 27 which is secured at one end to the flange 26 and extends upwardly and inwardly of the cover 25, through an opening 28 in the side of the hopper 16, and is secured at its other end to the opposite divergent wall of the cover 25, in such a manner that the cover, when moved to an open position, is supported on the side body 22 by the rod 27. The ends of the rod 27 may be secured to the cover 25 by nuts 28 or other suitable fastening devices.

The lower end 29 of the hopper 16 is frusto-conical in shape having walls converging inwardly from the lower end of the body 22 and the frusto-conical portion 29 is terminated at its lower end with a short cylindrical section 30 through which the feed passes as it leaves the hopper 16.

A cylindrical pan 31 of substantially the same diameter as the body 22 is located below the hopper 16, is formed with a bottom 32 and is open at its upper end. A plurality of L-shaped supporting bars 34 are fixed to the bottom 32 by rivets 35 and extend upwardly to be fastened to the lower section 30 of the hopper 16 by other rivets 35, or other suitable fastening devices, for supporting the hopper 16 above the feed pan 31, concentric thereto, with the lowermost edge of the lower section 30 spaced upwardly from the bottom 32 of the feed pan 31 so the feed may pass from the hopper 16 into the feed pan 31.

In order to vary this distance between the lower edge of the hopper 16 and the bottom of the pan 31 to vary the rate of flow of the feed therethrough, I have provided a valve or plate 36 which is adjustably secured to the lower end 30 of the hopper 16. The plate 36 is formed of an open ended cylindrical body having a series of angularly inclined slots 37 through the walls thereof. Screws 38 engage through the walls of the section 30 and through the slots 37. The plate 36 is fastened to the section 30 by wing nuts 39 on the screws 38 so the distance between the hopper 16 and bottom of the pan 32 may be varied by rotating the plate 36 whereupon the plate 36 will be raised or lowered by the screws 38 engaging in the inclined slots 37.

A substantially inverted U-shaped channel member 40 is fixed to the convergent walls of the frusto-conical section 29 of the hopper 16 at the juncture of the sections 29 and 30, to provide a rain shield and hinge barrel for the closures 41 of the feed pan 31. The member 40 is formed with an annular inner edge 42 for engaging the wall of the section 29 and the outer edge is formed with polygonal straight edges 44. The outermost edge of the member 40 is shorter than the inner edge or arm thereof so the end of the door 41 may be engaged therebetween.

An elongated U-shaped channel section 45 extends from each angle of the shield 40 outwardly to the upper edge of the feeding pan 31 and is fixed in this position by rivets 35, to provide downwardly and outwardly extending closure supporting means, said channel being narrower at shield 40 than at outer edge of feeding pan 31 to provide for sufficient clearance for the closures in the open position thereof.

Closures 41 are provided for covering the feed pan 31 and one of such closures 41 is provided for each straight edge 44 of the shield 40. The closures 41 are each of trapezium shape, having a pair of outwardly divergent long sides extending radially from the center of the feeder 15. The outwardly divergent sides are provided with downwardly extending flanges 46 which engage in the channels 45, the flange 46 on one side of the closure 41 engaging in a channel 45 adjacent the channel 45 in which the opposite flange engages. The inner edge of the closures 41 is provided with an upwardly extending flange 47 having a bead 48 thereon extending forwardly or outwardly of the inner edge of the flange through which extends a rod 60. Each end of the rod then passes through a hole in end plate 61, which is a U-shaped plate forming a hinge bearing for the closures 41. The U-shaped plate 61 is held in place by the same rivet which holds the U-shaped channel section 45. The rod 60 is then held in place by a cotter key or flattened at the end.

As the feed is taken by the animals from the feeding pan 31, the doors 41 being open, the feed in the hopper flows under the edge of the plate 36 into the pan 31. By reason of the consistency of the feed and the restriction to its free flow, the flow is often uneven and at times even stopped completely. In order to provide for a smooth even flow of the feed from the hopper 16 into the pan 31, I have provided agitators for moving the feed in the hopper and loosening it sufficient to permit a steady flow past the plate 36. Certain other feeders have been provided with agitators for this same general purpose, but the agitators constructed according to my invention are activated by the animal while feeding, thus providing agitation of the feed at exactly the time it is needed.

As there are provided a plurality of doors 41 from which the hogs may feed, means are provided within the feeder 15 between the confines of each door 41 opening for agitatating the feed in the immediate vicinity thereof. Such means comprise a plurality of agitating members 50 having rods 51 and 52 thereon.

Each member 50 consists of a flat bar of substantially L-shape, the lower arm thereof being at an obtuse angle to the upper arm, whereby the lower arm, as 54, may be held horizontally while the upper arm, as 55, is at an angle to the vertical center line of the hopper 16. An eye 56 is secured to or formed on the upper end of the arm 55, parallel to the lower arm 54.

For supporting the agitators 50 in the feeder, I have provided a conical base 57 concentric thereto which is secured at its lower divergent end to the bottom 32 of the pan 31, within the edges of the section 30 of the hopper 16 and a rod 58, centrally of the feeder 15 extending vertically from the bottom of the pan 31, above the base 57. The edge 56 of each of the agitators 50 loosely engages about the rod 58, with the arm 55 adjacent the surface of the base 57 and the arm 54 extending into the feeding pan 31 from below the edge of the plate 36 and spaced upwardly from the bottom 32, whereby the nose of an animal may strike the arm 54 and cause a movement of the agitator 50. The rod 52 is fixed to the bar 55 near the upper end thereof and extends into the conical section 29 of the hopper 16 and the U-shaped rod 51, having the bight thereof fixed to the arm 54, is bent inwardly and upwardly to extend through the opening between the bottom 32 and plate 36. The free outer end 59 of the arm 54 may be bent upwardly where it will extend upwardly in the feeding pan 31 to be more readily struck by the animal.

The eyes 56 of each agitator 50 engage about the shaft 58 one above the other, and the arms 54 are substantially in the same plane, thus requiring that the arms 55 of different agitators 50 be of a different length and at a different angle from that of the others.

I do not mean to confine myself to the exact details of construction herein disclosed, but claim all variations falling within the purview of the appended claims.

What I claim is:

1. A hog feeder comprising a cylindrical hopper, a frusto-conical lower section on the lower end of said hopper, a feeding pan below said hopper, a lower cylindrical section on said hopper extending from the lower convergent end of said frusto-conical section, supporting bars fixed on said pan and said hopper for supporting said hopper above said feeding pan with the lowermost edge thereof spaced upwardly from said pan, a conical base fixed to said pan extending convergingly upwards in said hopper, a shaft extending upwardly from the apex of said base, a cylindrical plate carried by the lowermost end of said hopper slidable thereon for closing the space between said hopper and said pan, means for fixing said plate in adjusted position, and feed agitators loose on said shaft, said agitators including a substantially L-shaped flat bar, one arm of said bar extending horizontally into said feeding pan, an eye on the upper end of the other arm engaging about said shaft, rods extending from said other arm into said frusto-conical section, U-shaped rods secured to said first arm and formed with legs extending parallel to said other arm into said lower cylindrical section for agitating the feed in said frusto-conical section and in said lower cylindrical section respectively upon rocking motion of said agitators, and a plurality of closures for said feed pan, said closures formed with an upstanding flange, a bead on said flange and an inverted U-shaped channel carried by said hopper engageable over said bead to provide a rain shield for said closure.

2. A hog feeder comprising a cylindrical hopper, a frusto-conical lower section on the lower end of said hopper, a feeding pan below said hopper, a lower cylindrical section on said hopper extending from the lower convergent end of said frusto-conical section, supporting bars fixed on said pan and said hopper for supporting said hopper above said feeding pan with the lowermost edge thereof spaced upwardly from said pan, a conical base fixed to said pan extending convergingly upwards in said hopper, a shaft extending upwardly from the apex of said base, a cylindrical plate carried by the lowermost end of said hopper slidable thereon for closing the space between said hopper and said pan, means for fixing said plate in adjusted position, and feed agitators loose on said shaft, said agitators including a substantially L-shaped flat bar, one arm of said bar extending horizontally into said feeding pan, an eye on the upper end of the other arm engaging about said shaft, rods extending from said other arm into said frusto-conical section, U-shaped rods secured to said first arm and formed with legs extending parallel to said other arm into said lower cylindrical section for agitating the feed in said frusto-conical section and in said lower cylindrical section respectively upon rocking motion of said agitators, a plurality of trapezium shaped closures for said feed pan, a rolled upper edge on said closures forming a tube, U-shaped bearing brackets fixed on said feeder at each end of said closures, a rod extending through said bearings and said tube, outwardly divergent sides on said closures, downwardly extending flanges on said sides, and U-shaped supporting members on said feeder between adjacent closures, said members tapering inwardly of said feeder, said flanges engageable in said members for sealingly supporting said closures in the closed position thereof.

WILLIAM J. PAX.

REFERENCES CITED

The following references are of record in the file of this patent:

UNITED STATES PATENTS

| Number | Name | Date |
|---|---|---|
| 570,569 | Smith, | Nov. 3, 1896 |
| 1,479,896 | Coleman | Jan. 8, 1924 |
| 1,485,469 | Riegel | Mar. 4, 1924 |
| 1,718,472 | McCollough | June 25, 1929 |
| 1,769,042 | Short | July 1, 1930 |
| 1,818,419 | Miller | Aug. 11, 1931 |
| 2,111,950 | Thiemann | Mar. 22, 1938 |
| 2,226,476 | Maggart | Dec. 24, 1940 |
| 2,429,542 | Amstutz | Oct. 21, 1947 |

FOREIGN PATENTS

| Number | Country | Date |
|---|---|---|
| 224,678 | Great Britain | Nov. 20, 1924 |